US006957639B2

(12) United States Patent
Yamada et al.

(10) Patent No.: US 6,957,639 B2
(45) Date of Patent: Oct. 25, 2005

(54) INCLINED ENGINE

(75) Inventors: Kiichiro Yamada, Sakai (JP);
Shinkichi Iwasaki, Sakai (JP);
Takahiro Kajihara, Sakai (JP)

(73) Assignee: Kubota Corporation, Osaka (JP)

( * ) Notice: Subject to any disclaimer, the term of this patent is extended or adjusted under 35 U.S.C. 154(b) by 119 days.

(21) Appl. No.: 10/663,160

(22) Filed: Sep. 15, 2003

(65) Prior Publication Data
US 2004/0187811 A1 Sep. 30, 2004

(30) Foreign Application Priority Data
Mar. 31, 2003 (JP) .......................... P 2003-093702

(51) Int. Cl.[7] ................................................. F02F 7/00
(52) U.S. Cl. ........................... 123/195 AC; 123/41.69; 123/192.2; 123/275; 123/363
(58) Field of Search .......................... 123/41.69, 192.2, 123/195 AC, 253–256, 258–263, 268, 270–278, 123/286–293, 363–377

(56) References Cited

U.S. PATENT DOCUMENTS

| 1,984,836 | A | * | 12/1934 | Kreis | ........................ 123/275 |
| 3,079,902 | A | * | 3/1963 | Ulbrich | .................... 123/41.69 |
| 3,149,618 | A | * | 9/1964 | Catterson | .................... 123/376 |
| 3,457,804 | A | * | 7/1969 | Harkness | .................. 123/192.2 |
| 4,656,981 | A | * | 4/1987 | Murata et al. | ............ 123/192.2 |
| 4,781,156 | A | * | 11/1988 | Berger et al. | ............. 123/192.2 |
| 4,811,705 | A | * | 3/1989 | Ono et al. | ............ 123/195 AC |
| 6,382,166 | B1 | | 5/2002 | Klika et al. | |

FOREIGN PATENT DOCUMENTS

| EP | 0 475 772 A2 | 3/1992 |
| EP | 1 072 770 A1 | 1/2001 |
| JP | 5-45876 Y2 | 11/1993 |
| JP | 11-303941 A | 11/1999 |
| JP | 11 303941 A | 11/1999 |
| JP | 2001-164987 A | 6/2001 |
| JP | 2002-266716 A | 9/2002 |

* cited by examiner

Primary Examiner—Noah P. Kamen
(74) Attorney, Agent, or Firm—Akin Gump Strauss Hauer & Feld, LLP

(57) ABSTRACT

In an inclined engine where a cylinder (2) projects from a crank case (1) obliquely and upwardly, when seen in a direction parallel to a center axis (3) of a crank shaft (10), under a specific observation condition in which the cylinder projecting direction is deemed as an upper right side, a valve operating cam gear (5) meshes with a crank gear (4) from a horizontal right side of the latter and a governor gear (6) is arranged in a space defined below a portion where the valve operating cam gear (5) meshes with the crank gear (4). This governor gear (6) engages with the valve operating cam gear (5) from a lower left side of the latter.

22 Claims, 8 Drawing Sheets

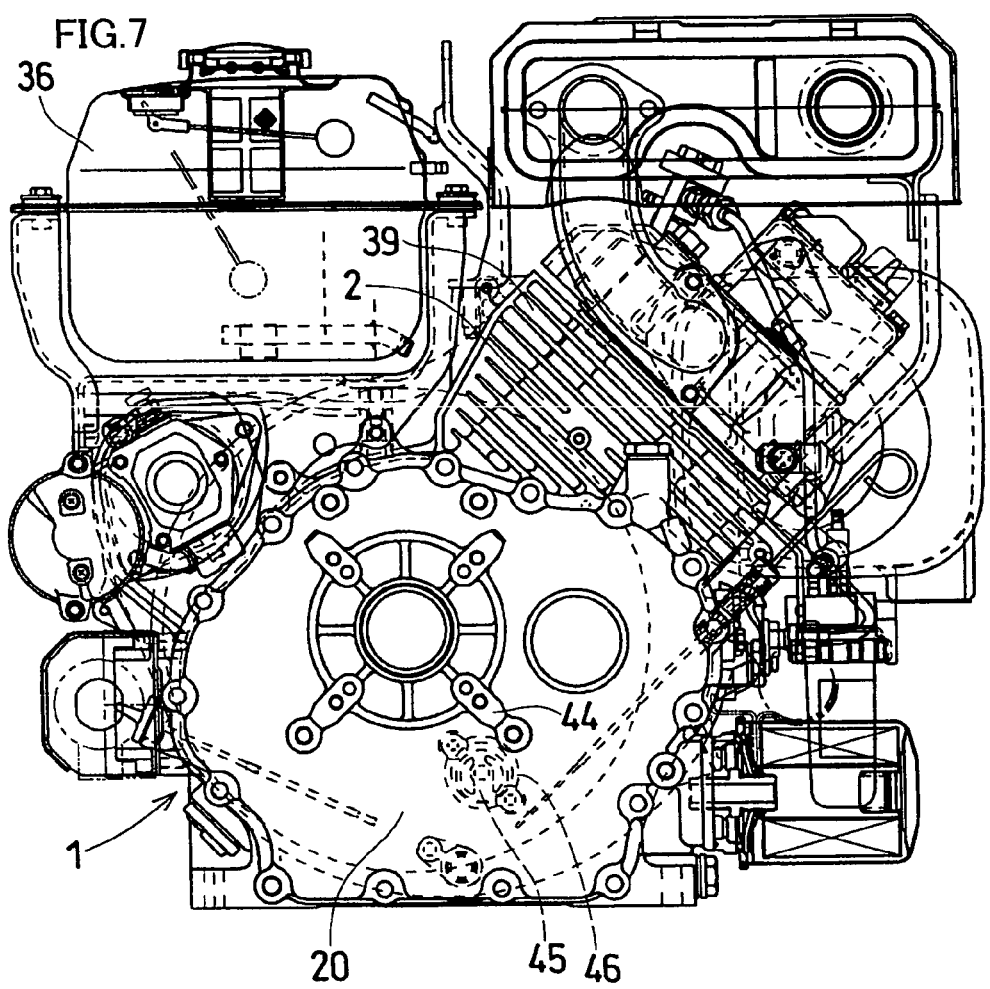

INCLINED ENGINE

BACKGROUND OF THE INVENTION

1. Field of the Invention

The present invention relates to an inclined engine.

2. Description of Prior Art

Conventionally, there is an engine which projects a cylinder from a crank case obliquely and upwardly like the present invention, as the inclined engine (see Japanese Patent Publication No. 11-303941).

The engine of this type is effectively used for reducing its height so as to decrease the height of a bonnet of a machine which is to be loaded with this engine.

This conventional engine composes a gear train by a crank gear, a valve operating cam gear, a governor gear and a balancer gear.

The conventional technique has the following problem.

Problem: The gear train is not compact.

Although the crank gear, the valve operating cam gear, the governor gear and the balancer gear compose the gear train, no device is made for their arrangement. This results in failing to make the gear train compact, which is one of the factors to inhibit the downsizing of the engine.

SUMMARY OF THE INVENTION

Briefly stated, the present invention is directed to an inclined engine that projects a cylinder 2 from a crank case 1 obliquely and upwardly. In this inclined engine, when seen in a direction parallel to a center axis 3 of a crank shaft, under a specific observation condition where a direction in which the cylinder 2 projects is deemed as an upper right side, a valve operating cam gear 5 meshes with a crank gear 4 from a horizontal right side of the latter. A governor gear 6 is arranged in a space defined below a portion where the crank gear 4 meshes with the valve operating cam gear 5. This governor gear 6 engages with the valve operating cam gear 5 from a lower left side of the latter.

(Invention of Claim 1)

The invention of claim 1 offers the following effect.

"Effect 1" The gear train becomes compact.

As shown in FIG. 1, the space defined below the portion where the crank gear 4 meshes with the valve operating cam gear 5 is effectively utilized as a space for arranging the governor gear 6. This results in making the gear train composed of them compact, thereby enabling us to attempt to downsize the engine.

(Invention of Claim 2)

The invention of claim 2 offers the following effect in addition to the effect of the invention as set forth in claim 1.

"Effect 2" It is possible to reduce the height of the engine.

As shown in FIG. 1, the cylinder 2 has its lower portion 2a projected into the crank case 1. Thus the height of the engine can be reduced by that projection.

"Effect 3" It is possible to secure cooling efficiency at the lower portion of the cylinder.

As shown in FIG. 1, the cylinder 2 has its lower portion 2a projected into the crank case 1 and opposed at its outer peripheral surface to an interior area of the crank case 1. The governor gear 6 has a lower portion immerged into oil 8 within an oil reservoir 7 and has an upper portion arranged above the oil 8 within the oil reservoir 7. Thus the governor gear 6 splashes the oil when it rotates, and the splashed oil adheres to the outer peripheral surface of the lower portion 2a of the cylinder 2 and cools the latter. Therefore, in spite of the fact that the cylinder 2 has its lower portion 2a projected into the crank case 1, it is possible to secure the cooling efficiency at the lower portion 2a of the cylinder 2.

"Effect 4" It is possible to inhibit the deterioration of the oil.

As shown in FIG. 1, under the specific observation condition, the valve operating cam gear 5 is arranged on the upper right side of the governor gear 6. Therefore, the valve operating cam gear 5 is not immersed into the oil 8 within the oil reservoir 7. Or even if it is immersed, the immersion amount is small. This makes it possible to prevent the valve operating cam gear 5 from stirring the oil 8 more than required with the result of inhibiting the deterioration of the oil 8 attributable to that stirring.

(Invention of Claim 3)

The invention of claim 3 offers the following effect in addition to the effect of the invention as set forth in claim 2.

"Effect 5" It is possible to enhance the cooling efficiency at the lower portion of the cylinder.

As shown in FIG. 1, when the engine is in operation, under the specific observation condition, the governor gear 6 rotates in a counter-clock wise direction and the valve operating cam gear 5 rotates in a clockwise direction. Under the specific observation condition, the valve operating cam gear 5 and the outer peripheral surface of the lower portion 2a of the cylinder 2 are arranged at such positions that they overlap each other. As shown in FIG. 2, when seen in a direction perpendicular to the center axis 3 of the crank shaft, the valve operating cam gear 5 is arranged so that it comes to a position adjacent the outer peripheral surface of the lower portion 2a of the cylinder 2. Accordingly, as shown in FIG. 1, when the engine is in operation, the oil 8 within the oil reservoir 7 is raised up by the governor gear 6, is transferred to the valve operating cam gear 5 and is supplied smoothly to the outer peripheral surface of the lower portion 2a of the cylinder 2. This can enhance the cooling efficiency at the lower portion 2a of the cylinder 2.

(Invention of Claim 4)

The invention of claim 4 offers the following effect in addition to the effect of the invention as set forth in claim 2 or claim 3.

"Effect 6" It is possible to enhance the cooling efficiency at the lower portion of the cylinder.

As shown in FIG. 1, the lower portion 2a of the cylinder 2 has the outer peripheral surface provided with horizontally directed cooling fins 9. Therefore, the oil supplied to the outer peripheral surface of the lower portion 2a of the cylinder 2 is retained without immediately falling down into the oil reservoir 7, by the cooling fins 9 which sufficiently absorb the heat of the lower portion 2a of the cylinder 2. This makes it possible to enhance the cooling efficiency at the lower portion 2a of the cylinder 2.

(Invention of Claim 5)

The invention of claim 5 offers the following effect in addition to the effect of any one of the inventions as set forth in claims 2 to 4

"Effect 7" It is possible to inhibit the deterioration of the oil.

As shown in FIG. 2, the governor gear 6 is made smaller than the valve operating gear 5 in thickness. This can prevent the governor gear 6 from stirring the oil more than required, which results in the possibility of inhibiting the deterioration of the oil 8 attributable to that stirring.

(Invention of Claim 6)

The invention of claim 6 offers the effect in addition to the effect of any one of the inventions as set forth in claims 1 to 5.

"Effect 8" It is possible to inhibit the deterioration of the oil.

As shown in FIG. 1, under the specific observation condition, a reciprocally moving balancer 11 is positioned leftwardly below a crank shaft 10. Thus the balancer 11 is immerged in the oil 8 within the oil reservoir 7 in a small amount or is not immerged in the oil 8 to result in the possibility of preventing the balancer 11 from stirring the oil 8 more than required, and therefore inhibiting the deterioration of the oil 8.

(Invention of Claim 7)

The invention of claim 7 offers the following effect in addition to the effect of any one of the inventions as set forth in claims 1 to 6.

"Effect 9" There is a high freedom in arrangement of the reciprocally moving balancer.

As shown in FIG. 3, the balancer 11 is partly immerged in the oil 8 within the oil reservoir 7 and is made to splash up the oil 8 when the balancer 11 moves up. Thus there is no need for providing an oil dipper in a connecting rod 12. This enhances the freedom in the arrangement of the balancer 11 by the amount corresponding to the unnecessity of taking the interference with the oil dipper into consideration.

(Invention of Claim 8)

The invention of claim 8 offers the following effect in addition to the effect of the invention as set forth in claim 7.

"Effect 10" There is a high lubricity between a large-diameter end portion of the connecting rod and a crank pin.

As shown in FIG. 3, the reciprocally moving balancer 11 has an upper surface formed with a groove 14 as opposed to the large-diameter end portion 13 of the connecting rod 12. Under the specific observation condition, the groove 14 is formed so as to position between a front side and an inner wall. Owing to this arrangement, the oil 8 which is splashed up by the balancer 11 is convergently supplied to the large-diameter portion 13 of the connecting rod 12, so that a sufficient amount of oil is fed to a portion between the large-diameter portion 13 of the connecting rod 12 and the crank pin 47. This result in a high lubricity between the large-diameter portion 13 of the connecting rod 12 and the crank pin 47.

(Invention of Claim 9)

The invention of claim 9 offers the following effect in addition to the effect of any one of the inventions as set forth in claims 1 to 8.

"Effect 11" It is possible to reduce the height of the engine.

As shown in FIG. 1, a valve operating cam shaft 15 is arranged in a space below the lower portion 2a of the cylinder 2. The valve operating cam shaft 15 is provided with a fuel injection cam 16. Under the specific observation condition, a fuel injection pump 17 is arranged horizontally on a horizontal right side of the fuel injection cam 16. Thus the space below the lower portion 2a of the cylinder 2 is effectively utilized so that the valve operating cam shaft 15, the fuel injection cam 16 and the fuel injection pump 17 can be accommodated in a compact manner. This can decrease the height of the engine.

(Invention of Claim 10)

The invention of claim 10 offers the effect in addition to the effect of any one of the inventions as set forth in claims 1 to 9.

"Effect 12" It is possible to reduce the height of the engine.

As shown in FIG. 4, a governor lever 18 is arranged in a space below the valve operating cam shaft 15. Owing to this arrangement, it is possible to effectively utilize the space below the lower portion 2a of the cylinder 2 so as to accommodate the governor lever 18 in a compact manner. This can reduce the height of the engine.

"Effect 13" It is possible to inhibit the waving of the oil within the oil reservoir.

As shown in FIG. 4, the governor lever 18 is partly immerged in the oil 8 within the oil reservoir 7. Therefore, it is possible to inhibit the waving of the oil 8 within the oil reservoir 7.

(Invention of Claim 11)

The invention of claim 11 offers the following effect in addition to the effect of the invention as set forth in claim 10.

"Effect 14" Rotation hunting hardly occurs.

As shown in FIG. 5, a governor holder 21 is provided with a stopper 24 for the governor lever 18. This stopper 24 receives a swing 18a of the governor lever 18 in a fuel amount decrease direction, thereby regulating an upper limit of an opening angle of a governor weight 33.

As the governor weight 33 opens by an increasing angle, the governor force fluctuates in correspondence with the variation of a rotation speed so largely that rotation hunting might easily occur. However, the present invention regulates the upper limit of the opening angle of the governor weight 33 to result in enabling the rotation hunting to hardly occur.

(Invention of Claim 12)

The invention of claim 12 offers the following effect in addition to the effect of the invention as set forth in claim 11.

"Effect 15" It is possible to reduce the number of parts.

As shown in FIG. 5, a stopper pin 25 is made to function so that it regulates the swing 18a of the governor lever 18 and fixes a pivot axis 22. There is no need for providing parts intended exclusively to do the respective functions, thereby allowing us to attempt to reduce the number of parts.

(Invention of Claim 13)

The invention of claim 13 offers the following effect in addition to the effect of the invention as set forth in claim 12.

"Effect 16" It is possible to easily remove the stopper pin.

As shown in FIG. 4(A), when seen in a direction parallel to a center axis of a stopper pin hole 27, a knock pin hole 30 overlaps the stopper pin hole 27 mutually and extends until it reaches an insertion end of the stopper pin 25 inserted into the stopper pin hole 27 as shown in FIGS. 4(B) and 5 so as to communicate with the stopper pin hole 27. Therefore, when a mechanical governor 19 is decomposed, repaired and so on, after the knock pin 31 has been removed from the knock pin hole 30, the stopper pin 25 is easily removed by pushing the insertion end of the stopper pin 25 through a fine tool inserted from the knock pin hole 30.

"Effect 17" To work holes becomes easy.

As shown in FIG. 4(A), when seen in a direction parallel to the center axis of the stopper pin hole 27, the stopper pin hole 27 and the knock pin hole 30 overlap mutually. As for the drilling of the both holes 27 and 30, it is also possible to perform the alignment in common with the both holes. In this case, working holes becomes easy.

(Invention of Claim 14)

The invention of claim 14 offers the following effect in addition to the effect of any one of the inventions as set forth in claims 11 to 13.

"Effect 18" It is possible to reduce the number of parts.

As shown in FIG. 5, a rod 34 projects from an input block 32. The governor holder 21 is opened to provide a hole 35 for limiting a swing. The rod 34 is inserted into the swing limitation hole 35, thereby limiting the swing of the input block 32. Consequently, the governor holder 21 also functions to limit the swing of the input block 32. Thus there is no need for providing a part intended exclusively for limiting the swing to result in the possibility of reducing the number of parts.

(Invention of Claim 15)

The invention of claim 15 offers the following effect in addition to the effect of the invention as set forth in claim 9.

"Effect 19" It is possible to secure sufficient fuel volume of a fuel tank.

As shown in FIG. 3 and set forth by claim 9, the valve operating cam shaft 15 is arranged in the space The valve operating cam shaft 15 is provided with the fuel injection cam 16. Under the specific observation condition, the fuel injection pump 17 is provided horizontally on the horizontal right side of the fuel injection cam 16. Additionally, as sown in FIG. 3, the present invention arranges the fuel tank 36 above the crank case 1. Therefore, even if the fuel tank 36 has its bottom lowered, fuel can be supplied by gravity from the fuel tank 36 to the fuel injection pump 17 to result in the possibility of securing sufficient fuel volume of the fuel tank 36.

(Invention of Claim 16)

The invention of claim 16 offers the following effect in addition to the effect of any one of the inventions as set forth in claims 1 to 15.

"Effect 20" It is possible to assure a good weight balance on right and left sides of engine.

As shown in FIG. 1, under the specific observation condition where the cylinder projecting direction is deemed as the upper right side, a starter motor 37 is arranged on an upper left side of the crank case 1. Thus owing to the weight arrangement of the cylinder 2 and the starter motor 37, it is possible to assure a good weight balance on the left and right sides of the engine.

(Invention of Claim 17)

The invention of claim 17 offers the effect in addition to the effect of any one of the inventions as set forth in claims 1 to 16.

"Effect 21" Every part surrounding a divided combustion chamber has a high durability.

As shown in FIG. 3, the divided combustion chamber 48 is arranged at a higher side portion of a cylinder head 38. Owing to this arrangement, even if coolant such as cooling air and cooling liquid has its temperature increased around the divided combustion chamber 48, the coolant of a high temperature floats up while hardly contacting a rocker arm chamber 58 positioned lower than the divided combustion chamber 48. Thus a rocker arm 59 or the like parts surrounding the divided combustion chamber 48 are hardly exposed to heat of a high temperature and therefore each has a high durability.

(Invention of Claim 18)

The invention of claim 18 offers the following effect in addition to the effect of any one of the inventions as set forth in claims 1 to 17.

"Effect 22" It is possible to intensively cool a higher side portion of the cylinder where heat load is high.

As shown in FIG. 3, on arranging the divided combustion chamber 48 at the higher side portion of the cylinder head 38, a cooling air passage 39 is formed at the higher side portion of the cylinder 2 having its higher and outer peripheral surface opposed to a higher side portion of a cylinder block. As shown in FIG. 6, the cooling air passage 39 has an inlet 40 facing a terminal end portion 42 of air transmission under pressure performed by a fan case 41. This makes it possible to intensively cool the higher side portion of the cylinder 2 where the heat load is high.

(Invention of Claim 19)

The invention of claim 19 offers the effect in addition to the effect of any one of the inventions as set forth in claims 1 to 18.

"Effect 23" It is possible to intensively cool a peripheral wall of the divided load is high.

As shown in FIG. 3, when arranging the divided combustion chamber 48 at the higher side portion of the cylinder head 38, a cooling passage 23 is formed on a side of the divided combustion chamber 48 while opposing to a peripheral wall of the divided combustion chamber 48. As shown in FIG. 6, the cooling air passage 23 has an inlet 29 facing the terminal end portion 42 of the air transmission under pressure performed by the fan case 41. This makes it possible to intensively cool the peripheral wall of the divided combustion chamber 48 where the heat load is high.

(Invention of Claim 20)

The invention of claim 20 offers the following effect in addition to the effect of the invention as set forth in claim 18 or claim 19.

"Effect 24" Air is transmitted in reduced loss to the terminal end portion of the air transmission under pressure performed by the fan case.

As shown in FIG. 6, a starter gear 43 is arranged at a position 58 away from a passage 57 of the air transmission under pressure, which extends from a starting end portion 56 of the fan case 41 to the terminal end portion 42 thereof. This dispenses away with the necessity of providing the passage 57 with a bulge that accommodates the starter gear 43, which results in reducing the loss of the air transmission to the terminal end portion 42 of the fan case 41.

(Invention of Claim 21)

The invention of claim 21 offers the effect in addition to the effect of any one of the inventions as set forth in claims 1 to 20.

"Effect 25" An oil pump is arranged in a higher freedom.

As shown in FIG. 7, under the specific observation condition, when arranging the oil pump 45 near a portion 44 of an engine's wall 20 for attaching a working machine, the oil pump 45 has its pump case 46 projected inwards of the engine's wall 20 as shown in FIG. 5. This dispenses away with the necessity of taking the interference with the attaching portion 44 into consideration. By this unnecessity, the oil pump 45 is arranged in a higher freedom.

(Invention of Claim 22)

The invention of claim 22 offers the following effect in addition to the effect of any one of the inventions as set forth in claims 10 to 14.

"Effect 26" The governor meters fuel amount in a high accuracy.

While a lower pivot boss 26B receives the weight of one lever 18B, an upper pivot boss 26A receives the weight of the other lever 18A. Should the other lever 18A be superimposed on the one lever 18B and the lower pivot boss 26B receive the weight of the both levers 18A and 18B, the one lever 18B does not operate well enough to result in decreasing a metering accuracy of the governor. On the other hand, according to the present invention, the one lever 18B does not receive the weight of the other lever 18A and therefore operates smoothly to result in enhancing the metering accuracy of the governor.

BRIEF DESCRIPTION OF THE DRAWINGS

FIG. 6 is an explanatory view of the engine shown in FIG. 1.

FIG. 7 is a rear view of the engine shown in FIG. 1; and

FIG. 8(A) is a plan view in cross section. FIG. 8(B) is a sectional view taken along a line B—B in FIG. 8 (A). FIG. 8 (C) is a sectional view taken along a line C—C in FIG. 8(B) in the case where a rotor rotates in a counter-clock wise direction. FIG. 8(D) is a view similar to FIG. 8(C) in the case where the rotor rotates rightwardly.

DESCRIPTION OF THE PREFERRED EMBODIMENTS

An embodiment of the present invention is explained on the base of the drawings.

FIGS. 1 to 7 explain an inclined engine according to the embodiment of the present invention. In this embodiment, explanation is given by utilizing a single-cylinder inclined diesel engine.

The embodiment is outlined as follows.

Figure 1:
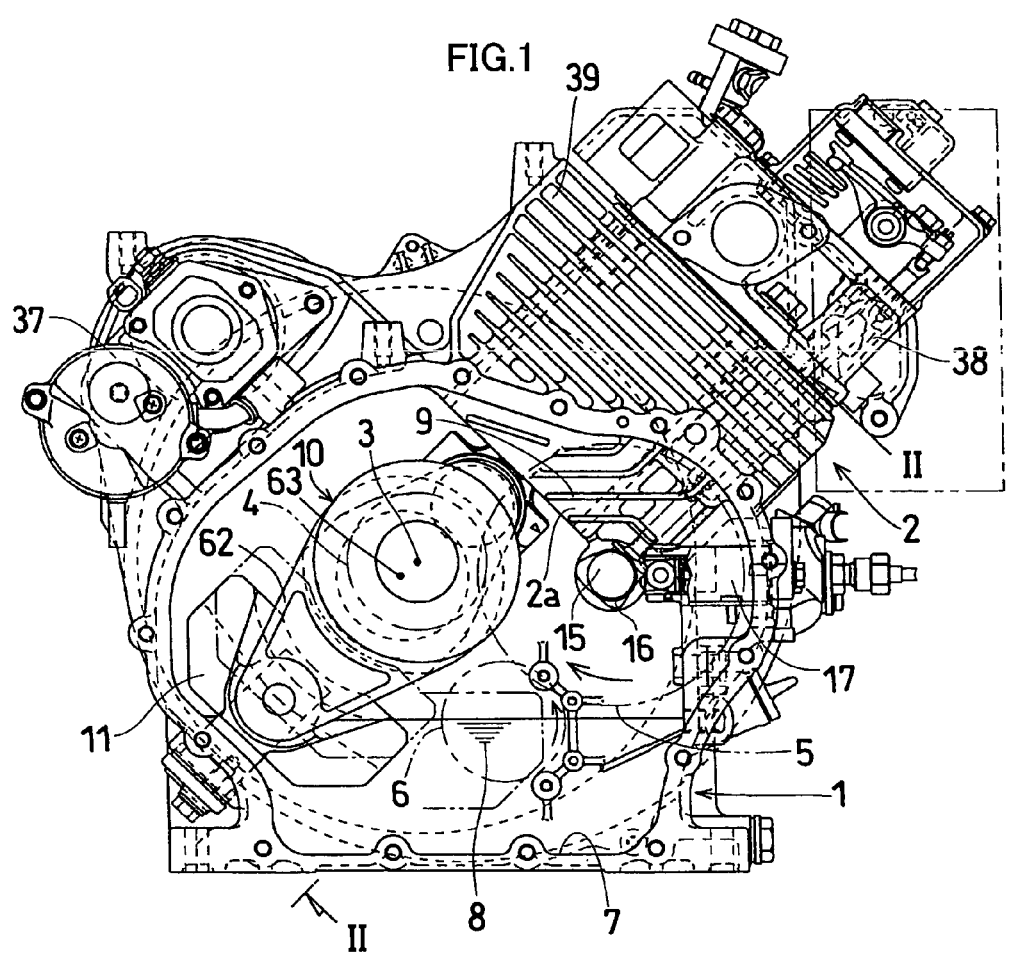
FIG. 1 is a rear view showing an inclined engine according to an embodiment of the present invention, with a rear cover removed.
Figure 3:
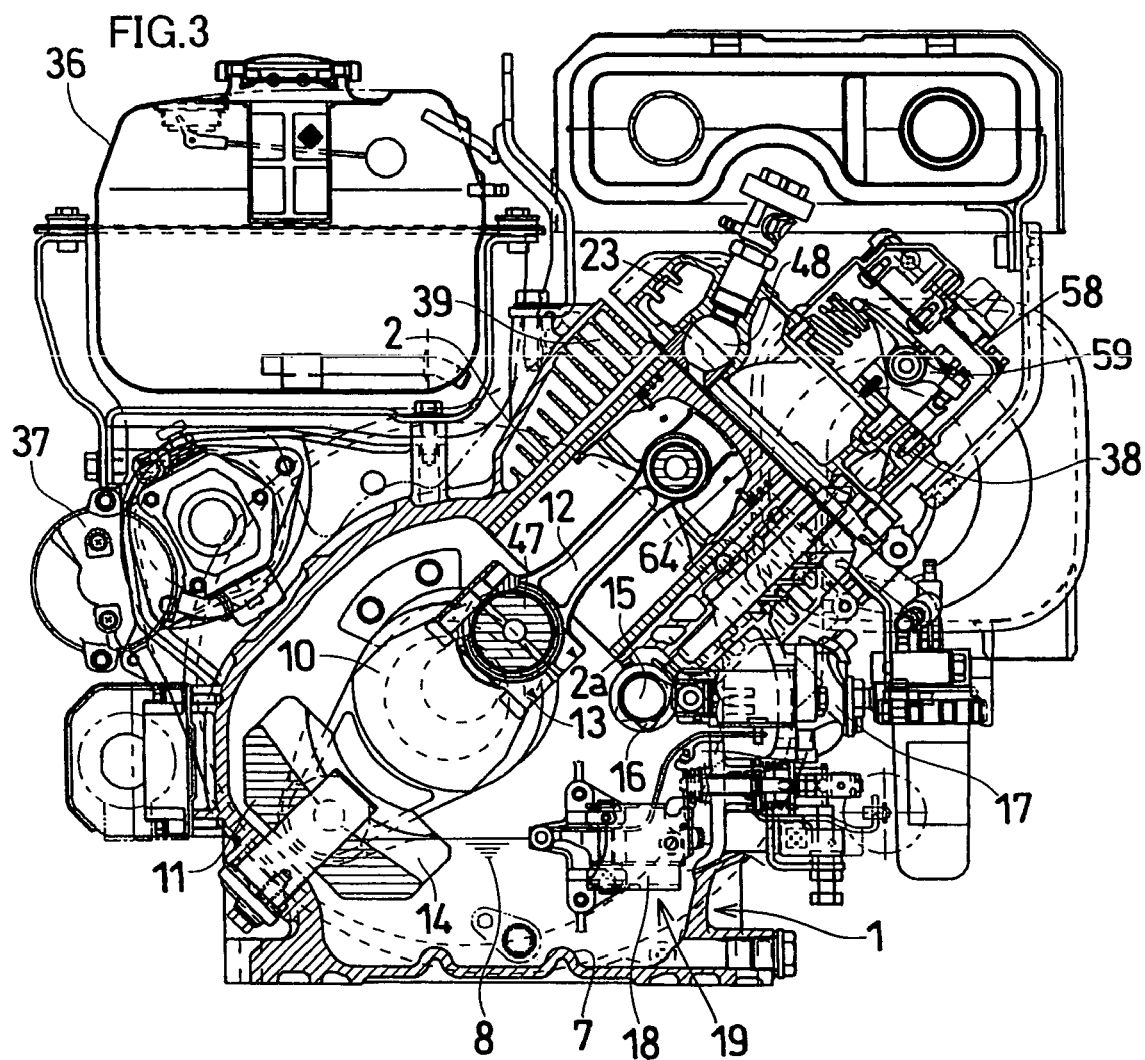
FIG. 3 is a rear view of the engine of FIG. 1 in vertical section.
Figure 4:
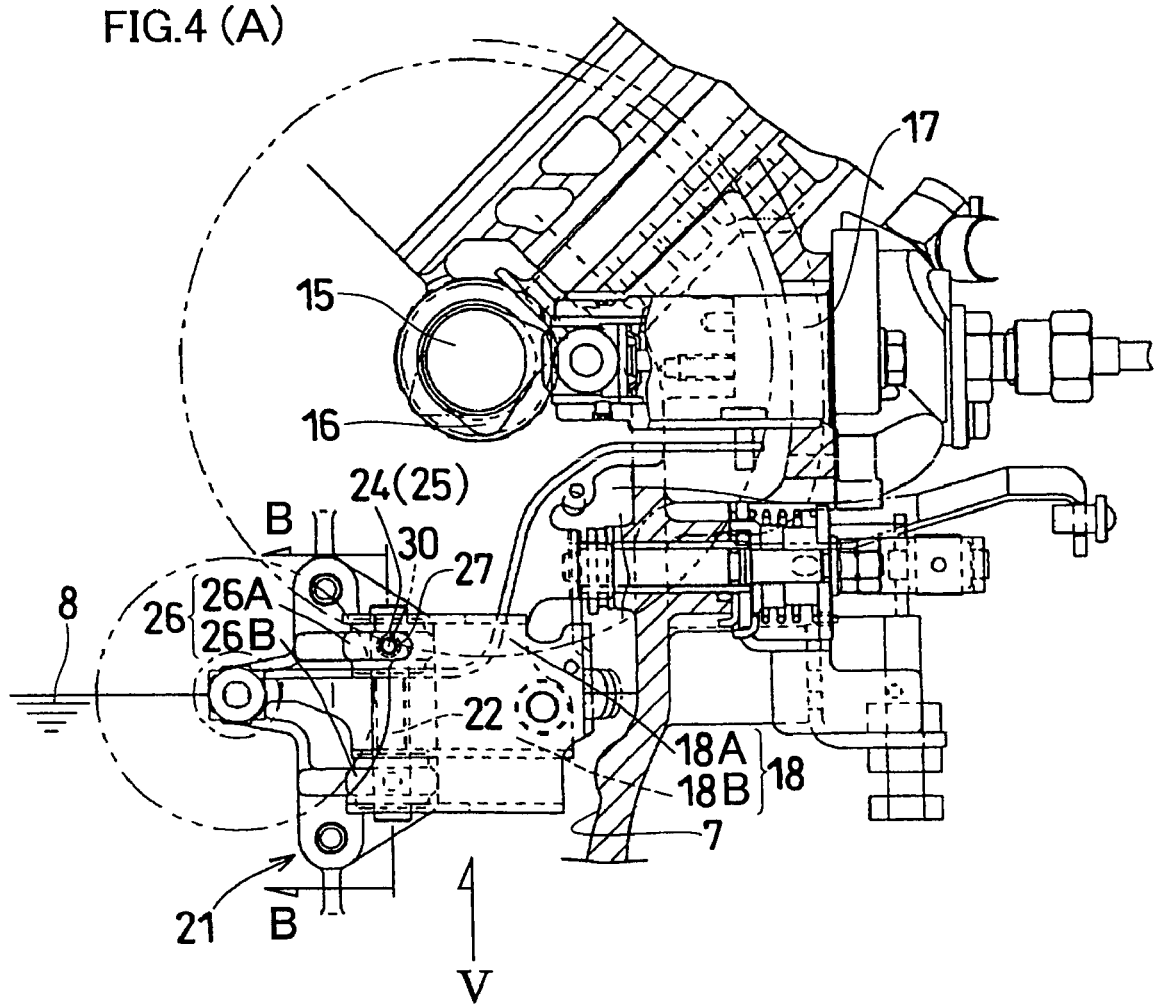
FIG. 4(A) is an enlarged rear view showing a governor lever and its surroundings of the engine shown in FIG. 1.
FIG. 4(B) is a sectional view taken along a line B—B in FIG. 4(A)
Figure 4:
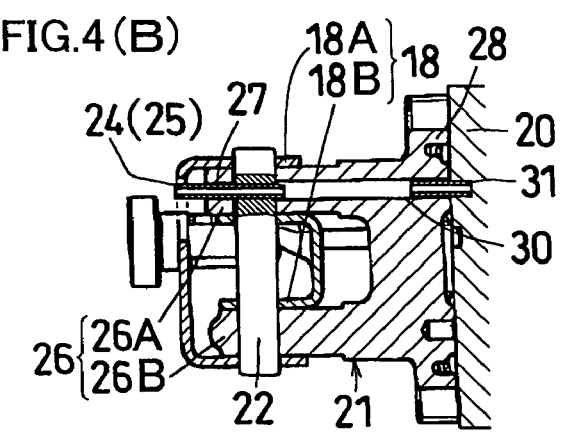
Figure 5A:
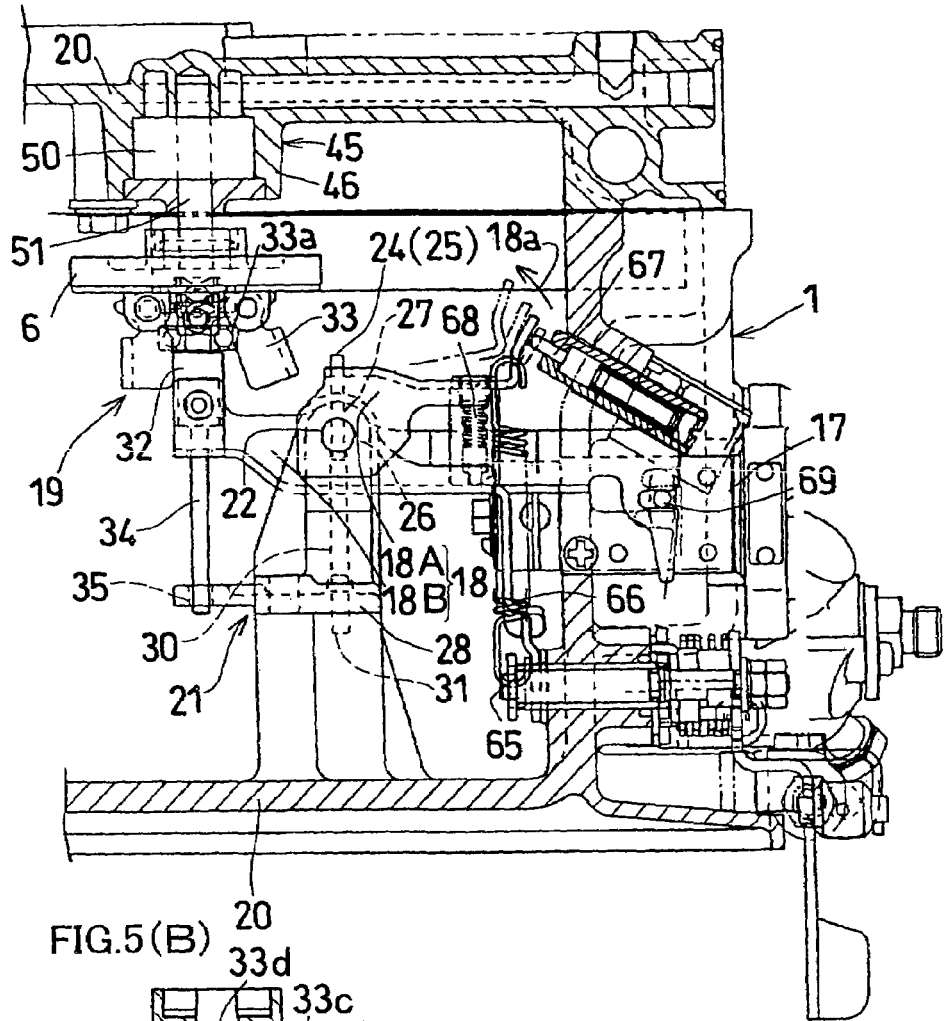
FIG. 5(A) is a view when seen in a V direction indicated by an arrow in FIG. 4(A).
Figure 5B:
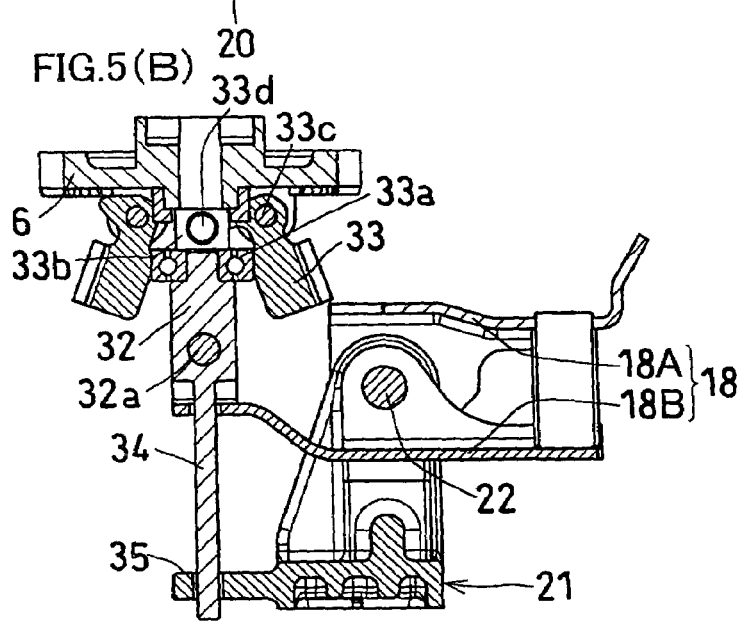
FIG. 5(B) is a bottom view, in cross section, of a governor.

This embodiment is characterized in:

that as shown in FIG. 1, the gear arrangement of a gear train is devised so as to attempt to downsize the engine and oil cool a lower portion 2a of a cylinder 92 that as shown in FIG. 3, the arrangement of a reciprocally moving balancer 11 is devised so as to attempt to perform lubrication within a crank case 1;

that as shown in FIGS. 3 to 5, the arrangement of a fuel injection pump 17 and a governor lever 18 is devised so as to attempt to downsize the engine;

that as shown in FIG. 3, the arrangement of a fuel tank 36 is devised so as to attempt to secure sufficient fuel volume;

that as shown in FIG. 3, the arrangement of a starter motor 37 is devised so as to attempt to assure good weight balance on left and right sides of the engine;

that as shown in FIG. 3, the arrangement of a divided combustion chamber 48 is devised so as to attempt to enhance the durability of the divided combustion chamber 48 and its surrounding parts;

that as shown in FIG. 3, cooling air passages 23 and 39 are arranged so as to attempt to cool the divided combustion chamber 48 and its surroundings; and that as shown in FIG. 7, an oil pump is arranged so as to attempt to enhance freedom of its arrangement.

The gear arrangement of the gear train of the engine is as follows.

As shown in FIG. 1, a cylinder 2 projects from a crank case 1 obliquely and upwardly. When seen in a direction parallel to a center axis 3 of a crank shaft, under a specific observation condition where the cylinder projecting direction is deemed as an upper right side, a valve operating cam gear 5 meshes with a crank gear 4 from a horizontal right side of the latter. A governor gear 6 is arranged in a space defined below a portion where the valve operating cam gear 5 meshes with the crank gear 4. This governor gear 6 engages with the valve operating cam gear 5 from a lower left side of the latter.

An oil cooling structure for a lower portion 2a of the cylinder 2 is as follows.

As shown in FIG. 1, the cylinder 2 has the lower portion 2a projected into a crank case 1 and the lower portion 2a of the cylinder 2 has an outer peripheral surface opposed to an interior area of the crank case 1. The governor gear 6 has a lower portion immerged into oil 8 within an oil reservoir 7 and has an upper portion arranged above the oil 8 within the oil reservoir 7. Under the specific observation condition, the valve operating cam gear 5 is arranged on the upper right side of the governor gear 6.

Figure 2:
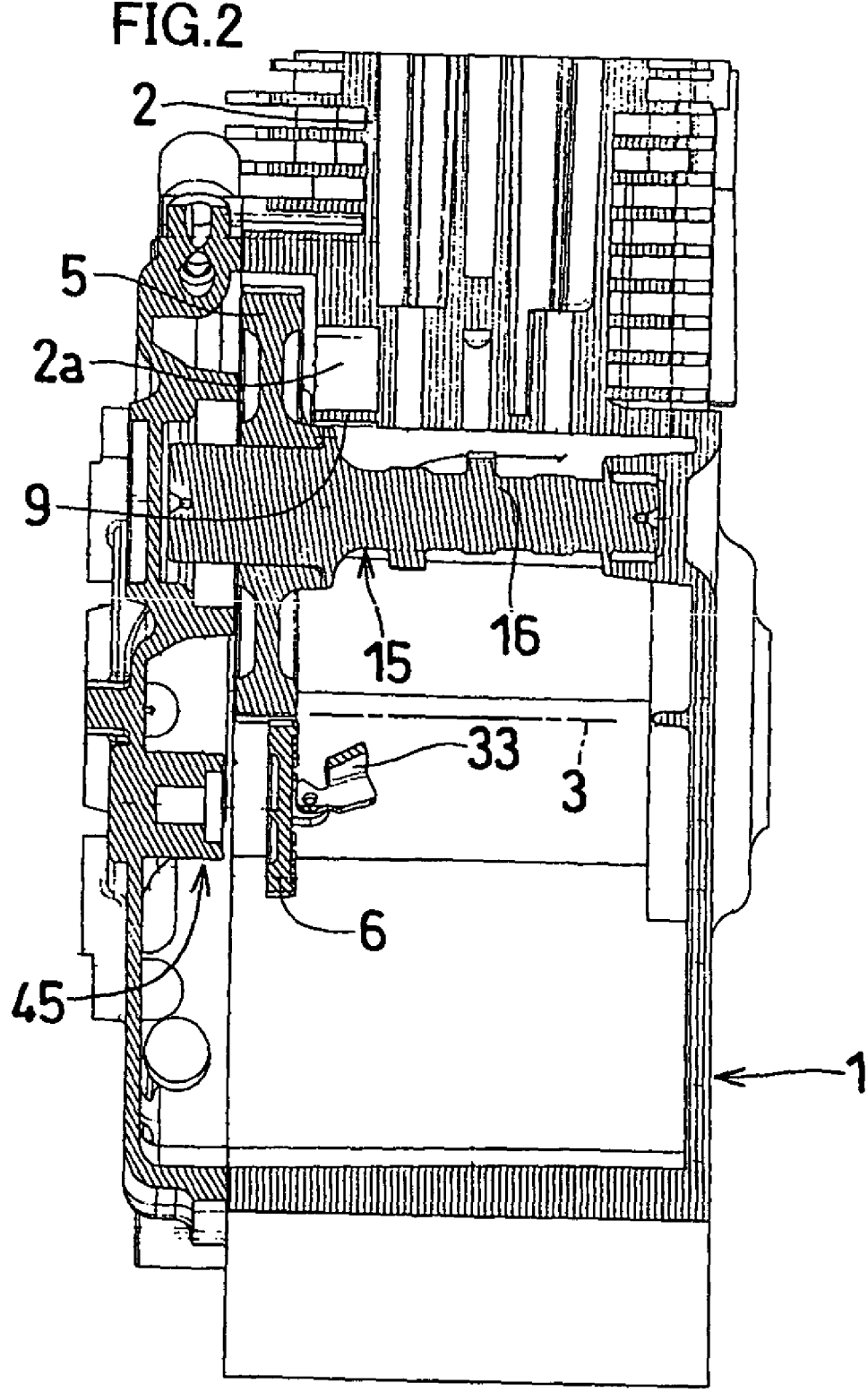
FIG. 2 is a sectional view taken along a line II—II in FIG. 1.

Further, as shown in FIG. 1, under the specific observation condition, when the engine is in operation, the governor gear 6 rotates in a counter-clock wise direction and the valve operating cam gear 5 rotates in a clockwise direction. Under the specific observation condition, the valve operating cam gear 5 and the outer peripheral surface of the lower portion 2a of the cylinder 2 are arranged at such positions that they overlap each other. As shown in FIG. 2, when seen in a direction perpendicular to the center axis 3 of a crank shaft, the valve operating cam gear 5 is made to position adjacent the outer peripheral surface of the lower portion 2a of the cylinder 2. The lower portion 2a of the cylinder 2 has the outer peripheral surface provided with horizontally directed cooling fins 9. In addition, as shown in FIG. 2, the governor gear 6 is smaller than the valve operating cam gear 5 in thickness.

The reciprocally moving balancer 11 is devised so that it is arranged as follows.

As shown in FIG. 3, under the specific observation condition, the reciprocally moving balancer 11 is made to position leftwardly and downwardly of the crank shaft 10. The reciprocally moving balancer 11 is partly immerged in the oil 8 of the oil reservoir 7 and splashes up the oil 8 when it moves up. Further, the balancer 11 has an upper surface formed with a groove 14 opposing to a large-diameter end portion 13 of a connecting rod 12. Under the specific observation condition, the groove 14 is made to be formed between a front side and an inner wall. As shown in FIG. 1, the balancer 11 is interlockingly connected to the crank shaft 10 via an interlocking arm 62. The interlocking arm 62 has a pivot point 63 on the crank shaft side and the pivot point 63 is eccentric from the center axis 3 of the crank shaft 10. As shown in FIG. 3, the balancer 11 moves down if a piston 64 moves up, and it moves up if the piston 64 moves down. This compensates the reciprocal vibratory force which occurs due to the vertical movement of the piston 64.

The fuel injection pump 17 and the governor lever 18 are arranged as follows.

As shown in FIG. 3, a valve operating cam shaft 15 is arranged in a space defined below the lower portion 2a of the cylinder 2 and is provided with a fuel injection cam 16. Under the specific observation condition, the fuel injection pump 17 is horizontally arranged on a horizontal right side of the fuel injection cam 16. Additionally, as shown in FIG. 4, a governor lever 18 is arranged in a space defined below the valve operating cam shaft 15 and is partly immerged in the oil 8 of the oil reservoir 7.

A governor holder 21 which supports the governor lever 18 has the following structure.

As shown in FIG. 5, when arranging a mechanical governor 19, the governor holder 21 is attached to an engine's wall 20 and supports the governor lever 18 through a pivot axis 22. The governor holder 21 is provided with a stopper 24 for the governor lever 18. This stopper 24 receives a swing 18a of the governor lever 18 in a fuel amount decrease direction, thereby regulating an upper limit of an opening angle of a governor weight 33. The engine's wall 20 to which the governor holder 21 is attached is a front wall of the crank case 1. A stopper pin 25 is employed for the stopper 24. The pivot axis 22 is internally fitted into a pivot boss 26 of the governor holder 21. The pivot boss 26 is opened to provide a hole 27 for the stopper pin 25. The stopper pin 25 is inserted through the stopper pin hole 27 and the pivot axis 22 in series along a radial direction of each of them. This stopper pin 25 fixes the pivot axis 22 to the pivot boss 26, form which the stopper pin 25 projects. The projection portion of the stopper pin 25 from the pivot boss 26 receives the governor lever 18.

The governor holder 21 is attached by the following structure.

As shown in FIG. 5, the governor holder 21 is provided with a seating portion 28. This seating portion 28 attaches the governor holder 21 to the engine's wall 20. This seating portion 28 is opened to provide a knock pin hole 30, into which a knock pin 31 is struck. In order to position the governor holder 21 through the struck pin 31 with respect to the engine's wall 20, as shown in FIG. 4(A), when seen in a direction parallel to a center axis of the stopper pin hole 27, the stopper pin hole 27 is made to overlap the knock pin hole 30 each other. Then, as shown in FIGS. 4(B) and 5, the knock pin hole 30 extends to a position that is an end to which the stopper pin 25 is inserted through the stopper pin hole 27, thereby communicating the knock pin hole 30 with the stopper pin hole 27.

As shown in FIG. 5, an input block 32 is swingably attached to a swing end of the governor lever 18. In order to convey a governor force from the governor weight 33 to the swing end of the governor lever 18 through the input block 32, a rod 34 projects from the input block 32 and the governor holder 21 is opened to provide a hole 35 for limiting the swing. The swing of the input block 32 is limited by inserting the rod 34 into the swing limiting hole 35. The input block 32 functions to smoothly convey the governor force generated in the governor weight 33 to the swing end of the governor lever 18. The swing end of the governor lever 18 is provided with a pivot axis 32a. The pivot axis 32a supports the input block 32 swingably. The governor gear 6 is provided with a pivot axis 33c which supports the governor weight 33 swingably. The governor weight 33 is provided with a pivot axis 33d which attaches an output block 33b swingably. Attached to the input block 32 is a pressure receiving bearing 33a which receives the governor force produced in the governor weight 33. The output block 33b is brought into butting contact with the pressure receiving bearing 33a. Should the swing of the input block 32 be not limited, when assembling the governor, the input block 32 is largely inclined to result in the difficulty of bringing the output block 33b of the governor weight 33 into butting relationship with the pressure receiving bearing 33a or when the engine has stopped, the input block 32 is greatly inclined to remove the butting relationship between the output block 33b of the governor weight 33 and the pressure receiving bearing 33 with the result of being sometimes unable to restore the original butting relationship. Therefore, it is necessary to limit the swing of the input block 32.

The fuel tank 36 and the starter motor 37 are arranged as follows.

As shown in FIG. 3, the fuel tank 36 is arranged above the crank case 1. Under the specific observation condition, the starter motor 37 is arranged on an upper left side of the crank case 1

The divided combustion chamber 48 is arranged and the cooling air passages 39 and 23 are constructed in the following manner.

Figure 6A:
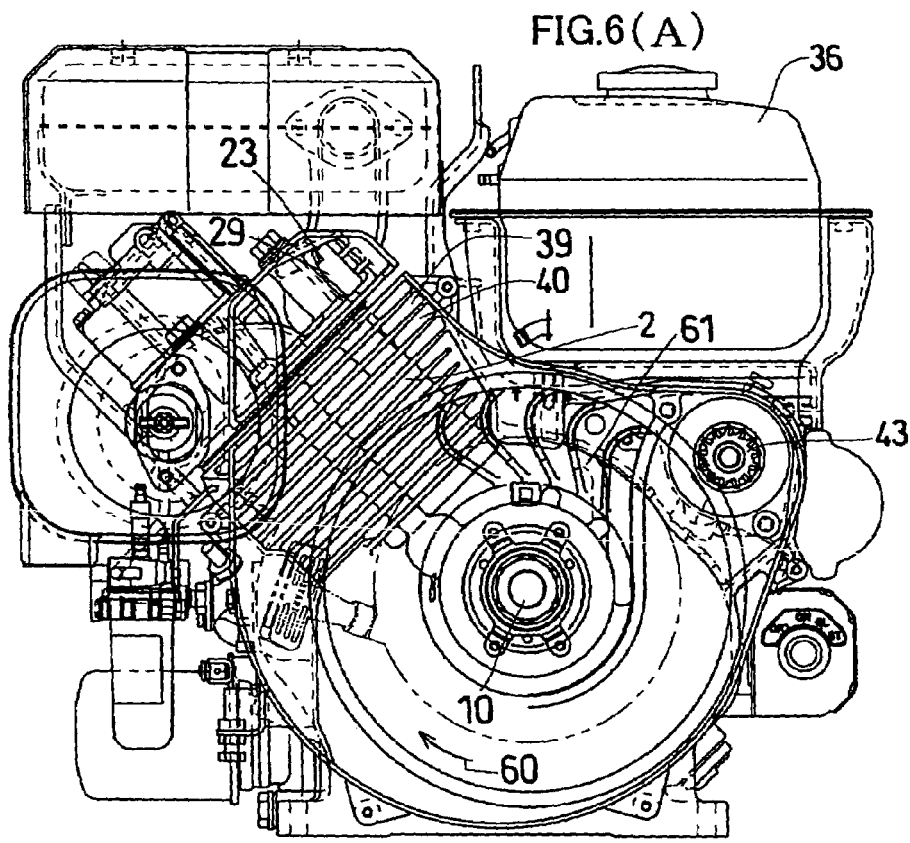
FIG. 6(A) is a front view of the engine with a fan case removed.
Figure 6B:
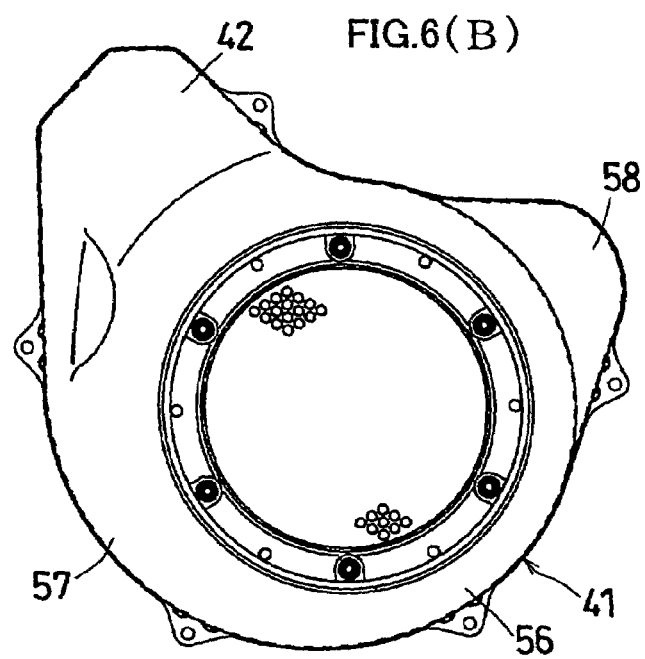
FIG. 6(B) is a front view of the fan case.

As shown in FIG. 3, the divided combustion chamber 48 is arranged at a higher side portion of the cylinder head 38. The cooling air passage 39 is formed at a higher side portion of the cylinder 2 which has a higher and outer peripheral surface opposed to a higher side portion of a cylinder block. As shown in FIG. 6, the cooling air passage 39 has an inlet 40 facing a terminal end portion 42 of air transmission under pressure performed by a fan case 41. Moreover, as shown in FIG. 3, another cooling air passage 23 is formed on a side of the divided combustion chamber 48 while opposing to a peripheral wall of the divided combustion chamber 48. As shown in FIG. 6, the cooling air passage 23 has an inlet 29 facing the terminal end portion 42 of the fan case 41. Further, a starter gear 43 is arranged at a position 58 away from a passage 57 for the air transmission under pressure, which extends from a starting end portion 56 of the fan case 41 to the terminal end portion 42 thereof. An arrow 60 in FIG. 6 indicates a direction in which a cooling fan 61 attached to the crank shaft 10 rotates. The starting end portion 56 of the fan case 41 is formed at a closing point where a gap between a peripheral side surface of the fan case 41 and a cooling fan 61 is narrowed. The terminal end portion 42 is formed downstream of the closing point and at a position where the gap between the peripheral side surface of the fan case 41 and the cooling fan 61 is widened.

The oil pump 45 is arranged and constructed in the following manner.

As shown in FIG. 7, under the specific observation condition, when arranging the oil pump 45 near a portion 44 of the engine's wall 20 for attaching a working machine, as shown in FIG. 5, a pump case 46 for the oil pump 45 projects inwards of the engine's wall 20. The pump case 46 accommodates a rotor 50 which is driven through a rotor shaft 51. The rotor shaft 51 is interlockingly connected to the crank shaft 10 via the governor gear 6. The engine's wall 20 formed with the pump case 46 is a rear cover which covers a rear opening of the crank case 1.

A modification of the oil pump 45 is constructed as follows.

Figure 8:
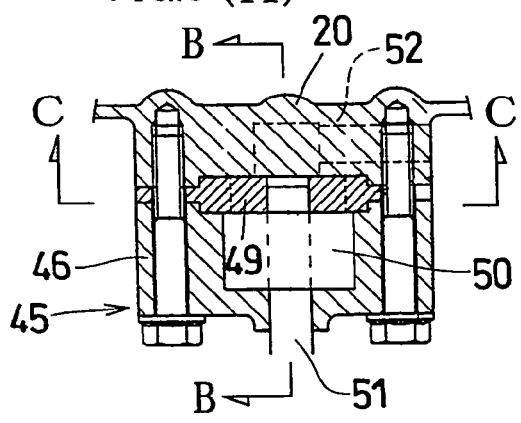
FIG. 8 is an explanatory view of a modification of an oil pump.
Figure 8:
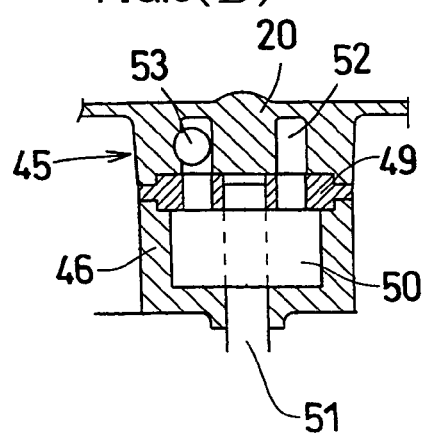
Figure 8:
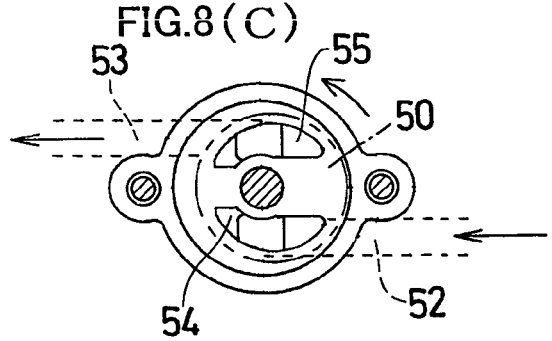
Figure 8:
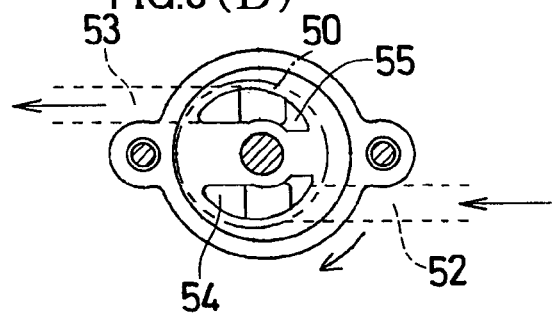

The oil pump 45 shown in FIG. 8 comprises a suction passage 52 and a discharge passage 53 provided in the engine's wall 20. The pump case 46 is attached to the engine's wall 20 via a spacer 49 and accommodates the rotor 50 which is driven through the rotor shaft 51. The spacer 49 is provided with a suction port 54 and with a discharge port 55. The spacer 49 is attached so that its front side can be reversed to its rear side and vice versa between the case where the rotor 50 is rotated in the counter-clock wise direction as shown in FIG. 8(C) and the case where the rotor 50 is rotated in the clock wise direction as shown in FIG. 8 (D). Thus the same part can attend to either of the above rotations.

The governor lever 8 is attached to the governor holder 21 as follows.

As shown in FIG. 5, when attaching the governor lever 18 which comprises a pair of levers 18A and 18B, the governor holder 21 is attached to the engine's wall 20. As shown in FIGS. 4(A) and 4(B), the governor holder 21 is provided with a pair of an upper pivot boss 26A and a lower pivot boss 26B. A pivot axis 22 has its lower and upper portions internally fitted into the pair of the upper pivot boss 26A and the lower pivot boss 26B, respectively and supports the pair of the levers 18A and 18B. While the lower pivot boss 26B receives the weight of the one lever 18B, the upper pivot boss 26A receives the weigh of the other lever 18A.

As shown in FIG. 4(B), each of the paired levers 18A and 18B comprises a workpiece made of a metal sheet bent so as to form a groove in section. The one lever 18B has a lower plate placed on an upper surface of the lower pivot boss 26B, thereby enabling the lower pivot boss 26B to receive the weight of the one lever 18B. The other lever 18A has an upper plate placed on an upper surface of the pivot boss 16A, thereby allowing the upper pivot boss 26A to receive the weight of the other lever 18A.

The one lever 18B has an upper plate brought into contact with an under surface of the pivot boss 26A so as to prevent an upward displacement of the one lever 18B. The other lever 18A has a lower plate brought into contact with an under surface of the lower pivot boss 26B so as to inhibit an upward displacement of the other lever 18A.

This pair of the levers 18A and 18B is prevented from being vertically removed only by making the governor holder 21 support them through the pivot axis 22 without utilizing a snap ring or the like.

As shown in FIG. 5, the one lever 18B is a governor force input lever which receives an input of the governor force form the governor weight 33 through the input block 32. A fuel metering rack 69 of the fuel injection pump 17 is interlockingly connected to the governor force input lever 18B. The other lever 18A is a spring force input lever which is interlockingly connected to a speed control lever 65 through a governor spring 66. A fuel limitation member 67 is made to face the spring force input lever 18A from a fuel amount increase side thereof. A torque-up device 68 is arranged between the spring force input lever 18A and the governor force input lever 18B.

By relying on this governor, when the engine operates with a partial load, the paired levers 18A and 18B swing unseparably and integrally to perform the metering of the fuel metering rack 69. When the engine operates with a rated load, the spring force input lever 18A is brought into contact with the fuel limitation member 67. When the engine operates with an overload, while the fuel limitation member 67 is receiving the spring force input lever 18A, only the governor force input lever 18B swings due to the unbalance between the governor force and the torque-up force to effect the metering of the fuel metering rack 69, thereby inhibiting the engine's stop.

What is claimed is:

1. An inclined engine where a cylinder (2) projects from a crank case (1) obliquely and upwardly, wherein
   when seen in a direction parallel to a center axis (3) of a crank shaft (10), under a specific observation condition in which the cylinder projecting direction is deemed as an upper right side, a valve operating cam gear (5) meshes with a crank gear (4) from a horizontal right side of the latter, a governor gear (6) being arranged in a space defined below a portion where the valve operating cam gear (5) meshes with the crank gear (4), the governor gear (6) engages with the valve operating cam gear (5) from a lower left side of the latter.

2. The inclined engine as set forth in claim 1, wherein the cylinder (2) has a lower portion (2a) projected into the crank case (1) and the lower portion 2a of the cylinder 2 has an outer peripheral surface opposed to an interior area of the crank case 1, the governor gear (6) having a lower portion immerged into oil (8) within an oil reservoir (7) and having an upper portion arranged above the oil (8) within the oil reservoir (7), under the specific observation condition, the valve operating cam gear (5) being arranged on an upper right side of the governor gear (6).

3. The inclined engine as set forth in claim 2, wherein under the specific observation condition, when the engine is in operation, the governor gear (6) rotates in a counter-clock wise direction and the valve operating cam gear (5) rotates in a clockwise direction,
   under the specific observation condition, the valve operating cam gear (5) and the outer peripheral surface of the lower portion (2a) of the cylinder (2) being arranged at such positions that they overlap each other, when seen in a direction perpendicular to the center axis (3) of the crank shaft, the valve operating cam gear (5) being made to position adjacent the outer peripheral surface of the lower portion (2a) of the cylinder (2).

4. The inclined engine as set forth in claim 2, wherein the lower portion (2a) of the cylinder (2) has the outer peripheral surface provided with a horizontally directed cooling fin (9).

5. The inclined engine as set forth in claim 2, wherein the governor gear (6) is smaller than the valve operating cam gear (5) in thickness.

6. The inclined engine as set forth in claim 1, wherein under the specific observation condition, a reciprocally moving balancer (11) positions leftwardly and downwardly of the crank shaft (10).

7. The inclined engine as set forth in claim 1, wherein a reciprocally moving balancer (11) is partly immerged in oil (8) within an oil reservoir (7) and splashes up the oil (8) when it moves up.

8. The inclined engine as set forth in claim 7, wherein the reciprocally moving balancer (11) has an upper surface provided with a groove (14) which opposes to a large-diameter end portion (13) of a connecting rod (12),
   under the specific observation condition, the groove (14) being formed between a front side and an inner wall.

9. The inclined engine as set forth in claim 1, wherein when it is applied to a diesel engine, a valve operating cam shaft (15) is arranged in a space defined below the lower portion (2a) of the cylinder (2) and is provided with a fuel injection cam (16), under the specific observation condition, a fuel injection pump (17) being horizontally arranged on a horizontal right side of the fuel injection cam (16).

10. The inclined engine as set forth in claim 9, wherein a fuel tank (36) is arranged above the crank case (1).

11. The inclined engine as set forth in claim 1, wherein a governor lever (18) is arranged in a space defined below a valve operating cam shaft (15) and is partly immerged into oil (8) within an oil reservoir (7).

12. The inclined engine as set forth in claim 11, wherein when arranging a mechanical governor (19), a governor holder (21) is provided on an engine's wall (20) and supports the governor lever (18) through a pivot axis (22), the governor holder (21) being provided with a stopper (24) for the governor lever (18), the stopper (24) receiving a swing (18a) of the governor lever (18) in a fuel amount decrease direction to thereby regulate an upper limit of an opening angle of a governor weight (33).

13. The inclined engine as set forth in claim 12, wherein a stopper pin (25) is utilized as the stopper (24) and the pivot axis (22) is internally fitted into a pivot boss (26) of the governor holder (21), the pivot boss (26) being opened to provide a stopper pin hole (27), the stopper pin (25) being inserted through the stopper pin hole (27) and the pivot axis (22) in series along a radial direction of each of them and fixing the pivot axis (22) to the pivot boss (26), the stopper pin (25) projecting from the pivot boss (26), the projection portion being made to receive the governor lever (18).

14. The inclined engine as set forth in claim 13, wherein the governor holder (21) is provided with a seating portion (28) which attaches the governor holder 21 to the engine's wall (20), the seating portion (28) being provided with a knock pin hole (30) into which a knock pin (31) is struck, on positioning the governor holder (21) with respect to the engine's wall (20) through the struck pin (31), when seen in a direction parallel to a center axis of the stopper pin hole (27), the stopper pin hole (27) and the knock pin hole (30) overlapping mutually, the knock pin (30) extending to a position that is an end to which the stopper pin (25) is inserted through the stopper pin hole (27), thereby communicating the knock pin hole (30) with the stopper pin hole (27).

15. The inclined engine as set forth in claim 12, wherein an input block (32) is swingably attached to an end portion of a swing of the governor lever (18), and when conveying a governor force from the governor weight (33) to the end portion of the swing of the governor lever (18) through the input block (32), a rod (34) projects from the input block (32) and the governor holder (21) is opened to provide a swing limitation hole (35) through which the rod (34) is inserted, thereby limiting a swing of the input block (32).

16. The inclined engine as set forth in claim 11, wherein when attaching the governor lever (18) which comprises a pair of levers (18A) and (18B), a governor holder (21) is attached to an engine's wall (20) and is provided with a pair of an upper pivot boss (26A) and a lower pivot boss (26B), a pivot axis (22) having its upper and lower portions internally fitted into the pair of the upper and lower pivot bosses (26A) and (26B), respectively and supporting the paired levers (18A) and (18B), the lower pivot boss (26B) receiving the weight of the one lever (18B) and the upper pivot boss (26A) receiving the weight of the other lever (18A).

17. The inclined engine as set forth in claim 1, wherein under the specific observation condition, a starter motor (37) is arranged on an upper left side of the crank case (1).

18. The inclined engine as set forth in claim 1, wherein a divided combustion chamber (48) is arranged at a higher side portion of a cylinder head (38).

19. The inclined engine as set forth in claim 1, wherein when arranging a divided combustion chamber (48) at a higher side portion of a cylinder head (38), a cooling air passage (39) is formed at a higher side portion of the cylinder (2) which has a higher and outer peripheral surface opposed to a higher side portion of a cylinder block, the cooling air passage (39) having an inlet (40) facing a terminal end portion (42) of air transmission under pressure performed by a fan case (41).

20. The inclined engine as set forth in claim 19, wherein a starter gear (43) is arranged at a position (58) away from a passage (57) for the air transmission under pressure, which extends from a starting end portion (56) of the fan case (41) to the terminal end portion (42) thereof.

21. The inclined engine as set forth in claim 1, wherein when arranging a divided combustion chamber (48) at a higher side portion of a cylinder head (38), a cooling air passage (23) is formed on a side of the divided combustion chamber (48) while opposing to a peripheral wall of the divided combustion chamber (48), the cooling air passage (23) having an inlet (29) facing a terminal end portion (42) of air transmission under pressure performed by a fan case (41).

22. The inclined engine as set forth in claim 1, wherein under the specific observation condition, when arranging an oil pump (45) near a portion (44) of an engine's wall (20) for attaching a working machine, a pump case (46) of the oil pump (45) projects inwards of the engine's wall (20).

* * * * *